United States Patent
Hirai et al.

(10) Patent No.: US 9,036,112 B2
(45) Date of Patent: May 19, 2015

(54) OPTICAL SHEET, OPTICAL SHEET PRODUCTION METHOD, SURFACE-EMITTING APPARATUS, AND LIQUID CRYSTAL DISPLAY APPARATUS

(75) Inventors: Noriyuki Hirai, Miyagi (JP); Akihiro Horii, Miyagi (JP); Hiroshi Mizuno, Miyagi (JP); Akiko Kakibe, Miyagi (JP); Tokuhiro Morioka, Miyagi (JP); Shunichi Kajiya, Miyagi (JP)

(73) Assignee: Sony Corporation, Tokyo (JP)

( * ) Notice: Subject to any disclaimer, the term of this patent is extended or adjusted under 35 U.S.C. 154(b) by 932 days.

(21) Appl. No.: 12/731,911

(22) Filed: Mar. 25, 2010

(65) Prior Publication Data

US 2010/0253879 A1    Oct. 7, 2010

(30) Foreign Application Priority Data

Apr. 2, 2009    (JP) .................................. 2009-090156

(51) Int. Cl.
  *G02F 1/1335*  (2006.01)
  *G02B 1/04*    (2006.01)
  *G02B 5/04*    (2006.01)

(52) U.S. Cl.
  CPC . *G02B 1/04* (2013.01); *G02B 5/045* (2013.01)

(58) Field of Classification Search
  None
  See application file for complete search history.

(56) References Cited

U.S. PATENT DOCUMENTS

2008/0223510 A1*    9/2008    Mizuno et al. ................ 156/209

FOREIGN PATENT DOCUMENTS

| | | |
|---|---|---|
| JP | 2002-243938 | 8/2002 |
| JP | 2006-292838 | 10/2006 |
| JP | 2006-310150 | 11/2006 |
| JP | 2007-286573 | 11/2007 |
| JP | 2008-525231 | 7/2008 |
| JP | 2008-262165 | 10/2008 |
| JP | 2009-21037 | 1/2009 |
| WO | 2005/083475 | 9/2005 |

OTHER PUBLICATIONS

Japanese Office Action issued May 14, 2013 in corresponding Japanese Patent Application No. 2009-090156.
Japanese Office Action issued Jan. 8, 2013 for corresponding Japanese Appln. No. 2009-090156.

* cited by examiner

*Primary Examiner* — Sarah Hahm
(74) *Attorney, Agent, or Firm* — K&L Gates LLP

(57) ABSTRACT

An optical sheet includes a sheet body including a single translucent resin material layer having a first surface that light enters and a second surface that the light exits. The sheet body is orientationally crystallized in a first in-plane axis direction and a second in-plane axis direction orthogonal to each other and having a linear expansion coefficient of $1.0*10E-5/°C$. or less in all in-plane directions. A structure surface portion that has a geometric configuration and is formed on at least one of the first surface and the second surface.

12 Claims, 7 Drawing Sheets

|  |  | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Thickness (um) |  | 137.5 | 146.3 | 137.5 | 137.5 | 137.5 | 130 | 262.5 | 262.5 | 262.5 | 256.3 |
| Linear expansion coefficient (1/°C) | MD | 6.0×10E-6 | 8.0×10E-6 | 4.8×10E-6 | 6.1×10E-6 | 6.0×10E-6 | Warpage | 4.0×10E-5 | 9.0×10E-5 | 6.5×10E-6 | 4.2×10E-6 |
|  | TD | 6.0×10E-6 | 8.5×10E-6 | 4.8×10E-6 | 6.1×10E-6 | 6.0×10E-6 | Warpage | 4.0×10E-5 | 9.0×10E-5 | 6.5×10E-6 | 4.0×10E-5 |
| Young's modulus (Gpa) | MD | 3.6 | 3.1 | 3.8 | 3.5 | 2.2 | 4.5 | 2.1 | 2.9 | 3.2 | 6.5 |
|  | TD | 3.6 | 3.0 | 3.8 | 3.5 | 2.2 | 4.5 | 2.1 | 2.9 | 3.2 | 2.5 |
| Total light transmittance |  | 93% | 92% | 90% | 88% | 90% | 91% | 93% | 79% | 58% | 93% |
| Swell |  | ○ | ○ | ○ | ○ | × | × | × | △ | ○ | × |

FIG.7

OPTICAL SHEET, OPTICAL SHEET PRODUCTION METHOD, SURFACE-EMITTING APPARATUS, AND LIQUID CRYSTAL DISPLAY APPARATUS

CROSS REFERENCES TO RELATED APPLICATIONS

The present application claims priority to Japanese Priority Patent Application JP 2009-090156 filed on Apr. 2, 2009, the entire content of which is hereby incorporated by reference.

BACKGROUND

The present disclosure relates to an optically-transparent optical sheet capable of suppressing a deformation due to a thermal expansion, a method of producing the optical sheet, and a surface-emitting apparatus and a liquid crystal display apparatus that include the optical sheet.

A liquid crystal display apparatus includes a liquid crystal display panel and a backlight as an illumination light source. Incorporated into the backlight in addition to a sheet that diffuses light emitted from a light source and a sheet that collects light on the liquid crystal display panel side are various optical sheets such as a polarization separation sheet.

In recent years, along with a prominent progress of thinning of liquid crystal display apparatuses, thinning of optical sheets to be incorporated into backlights of the liquid crystal display apparatuses is under way. One of the problems caused by the thinning of optical sheets is lowering of rigidity. As a rigidity of an optical sheet becomes lower, the optical sheet is more easily deformed by a temperature rise in the backlight. If a linear expansion coefficient of the optical sheet large, a swell is caused in the sheet along with the temperature rise in the backlight, and luminance unevenness due to the swell is visually recognized via a panel.

For solving such a problem, Japanese Patent Application Laid-open No. 2009-21037 (paragraph [0054], FIGS. 1 and 2; hereinafter, referred to as Patent Document 1), for example, discloses a structure in which linear members that restrict a deformation of an optical sheet due to a thermal expansion are provided in a case portion of a backlight. With this structure, the optical sheet and a liquid crystal display panel are prevented from coming into contact with each other, and luminance uniformity of a display screen is secured.

In the structure disclosed in Patent Document 1, however, there is a problem that, since additional components called linear members are required, the number of components of the backlight increases. Moreover, since the linear members are provided across a light-emitting surface of the optical sheet, various restrictions need to be placed on structures and arrangements of the linear members so that the linear members cannot be visually recognized through the panel.

In view of the circumstances as described above, there is a need for an optical sheet capable of suppressing a deformation due to a thermal expansion, a method of producing the optical sheet, and a surface-emitting apparatus and a liquid crystal display apparatus that include the optical sheet.

SUMMARY

According to an embodiment, there is provided an optical sheet including a sheet body and a structure surface portion.

The sheet body is constituted of a single translucent resin material layer having a first surface that light enters and a second surface that the light exits. The sheet body is orientationally crystallized in a first in-plane axis direction and a second in-plane axis direction orthogonal to each other. The sheet body has a linear expansion coefficient of $1.0*10E-5/°$ C. or less in all in-plane directions.

The structure surface portion has a geometric configuration and is formed on at least one of the first surface and the second surface.

Since the optical sheet is constituted of a single resin material layer, a warpage of the sheet that is caused by a difference in thermal expansion coefficients among layers in a case where the optical sheet is constituted of a multilayer structure formed of different types of materials is prevented from occurring. Further, since the optical sheet is orientationally crystallized in the in-plane biaxial directions, a rigidity in the orientation direction is enhanced, and a linear expansion coefficient decreases. As a result, a deformation amount of the optical sheet due to a thermal expansion can be suppressed to be small. Further, since the thermal expansion of the sheet body can be suppressed in all the in-plane directions, a swell of the sheet due to a difference in the thermal expansion amounts between the in-plane biaxial directions can be suppressed. In addition, unlike a random crystallization, the oriented crystallization can prevent the sheet from whitening. Accordingly, because a transparency of the sheet body is maintained, an effect of the optical sheet is not lost.

The linear expansion coefficient of the optical sheet in the in-plane directions is $1.0*10E-5/°$ C. or less. For example, a sheet formed of an amorphous resin such as polycarbonate, that is versatilely used as an optically-transparent sheet has a linear expansion coefficient larger than $1.0*10E-5/°$ C. Therefore, a thermal deformation such as a swell is suppressed more in the optical sheet than in this type of an amorphous resin sheet. Moreover, a Young's modulus in the axial directions for obtaining the linear expansion coefficient of $1.0*10E-5/°$ C. or less is, for example, 3.0 GPa or more. Thus, by stretching the sheet body to an extent that this much rigidity can be obtained, desired heat characteristics can be obtained.

Here, "E" in $10E-5$ represents an exponential, and $10E-5$ is the same as $10^{-5}$. Further, "G" in 3.0 GPa represents giga, and 3.0 GPa is the same as $3.0*10E9$ Pa.

The structure surface portion controls an orientation of light that is transmitted through the optical sheet, for example. The structure surface portion may either be formed on the first surface on a light-incident side or the second surface on a light-emitting side, or may be formed on both the first surface and the second surface. In this embodiment, the structure surface portion is formed on the surface of the optical sheet on the light-emitting side (second surface).

The structure surface portion may have a prism configuration with a triangular cross section. With this structure, the optical sheet can be structured as a light collection sheet. The configuration of the structure surface portion is not limited to the prism configuration and may instead be a curved convex or concave lens configuration.

The sheet body may be formed of a crystalline resin stretched in the first in-plane axis direction and the second in-plane axis direction. The crystallization of the crystalline resin progresses in the stretching directions, and the Young's modulus (elastic modulus) increases in those directions. The linear expansion coefficient decreases in the stretching directions along with an increase of the Young's modulus, and a thermal deformation is thus suppressed. Examples of the crystalline resin include PET (polyethylene terephthalate), PEN (polyethylene naphthalate), and a PET-PEN copolymer, though of course not limited thereto.

Moreover, since the optical sheet has a total light transmittance of 80% or more, an optical sheet with a small transmission loss can be obtained. The transmittance of the optical sheet is influenced by crystalline orientation characteristics. With a random crystalline orientation, the sheet is whitened and a transmittance decreases. In this regard, by stretching the sheet body in the biaxial directions, a regularity can be imparted to the crystalline orientation, and desired heat-resistant deformation characteristics can be imparted while securing a transparency.

A thickness of the sheet body including the structure surface portion may be, for example, 10 μm or more and 300 μm or less. With the thickness smaller than 10 μm, there is a fear that a handling ability may be lowered. With the thickness exceeding 300 μm, a contribution ratio of the sheet to thinning decreases.

A refractive index in the first in-plane axis direction and the second in-plane axis direction may be 1.59 or more. With this structure, when the optical sheet is structured as a light collection sheet, a refractive index difference at an interface between the optical sheet and an air layer can be increased to enhance a light collection property, and a luminance improvement rate can thus be increased.

According to an embodiment, there is provided an optical sheet production method including the step of orientationally crystallizing a translucent sheet that is formed of a single crystalline resin and has a first surface and a second surface by stretching the sheet in in-plane biaxial directions so that a linear expansion coefficient becomes $1.0*10E-5/°$ C. or less in all in-plane directions. A structure surface portion having a geometric configuration is formed on at least one of the first surface and the second surface of the sheet.

By orientationally crystallizing the sheet in the in-plane biaxial directions in the optical sheet production method, a rigidity in those directions is enhanced, and a linear expansion coefficient is lowered. Accordingly, since the thermal expansion can be suppressed in all the in-plane directions, an optical sheet having less deformation due to the thermal expansion can be produced.

The step of orientationally crystallizing the sheet may be carried out prior to the step of forming the structure surface portion on the sheet.

Accordingly, an optical sheet in which the structure surface portion has an excellent shape accuracy can be produced.

The step of orientationally crystallizing the sheet may include a first stretching step and a second stretching step. The first stretching step includes stretching the sheet in a first in-plane axis direction. The second stretching step includes stretching the sheet in a second in-plane axis direction orthogonal to the first in-plane axis direction. In this case, the step of forming the structure surface portion having the geometric configuration is carried out after the first stretching step but before the second stretching step.

Accordingly, an optical sheet in which the structure surface portion has an excellent shape accuracy can be produced.

The geometric configuration may include a prism configuration that has a ridge line and whose cross section is triangular. In this case, in the step of forming the structure surface portion that is carried out after the first stretching step, the ridge line is formed in the first in-plane axis direction.

Accordingly, a fluctuation of an apex angle of the structure surface portion before and after the stretch can be suppressed.

On the other hand, the step of orientationally crystallizing the sheet may be carried out after the step of forming the structure surface portion on the sheet.

In this case, the shape accuracy of the structure surface portion can be controlled by a stretching amount of the sheet.

In the step of forming the structure surface portion, a transfer mold including a structure surface having a geometric configuration may be used. Accordingly, a structure surface portion having an excellent shape accuracy can be formed. Moreover, since the second surface is a surface on the light-emitting side, orientation characteristics of emitted light can be controlled highly accurately by the structure surface portion.

According to an embodiment, there is provided a surface-emitting apparatus including an optical sheet and an illumination light source.

The optical sheet is constituted of a single translucent resin material layer having a first surface that light enters and a second surface that the light exits. The optical sheet includes a structure surface portion having a geometric configuration on at least one of the first surface and the second surface. The optical sheet is orientationally crystallized in a first in-plane axis direction and a second in-plane axis direction orthogonal to each other. The optical sheet has a linear expansion coefficient of $1.0*10E-5/°$ C. or less in all in-plane directions.

The illumination light source is provided on the first surface side of the optical sheet and irradiates light onto the first surface.

According to the surface-emitting apparatus, since a deformation of the optical sheet due to a thermal expansion is suppressed, luminance unevenness can be suppressed.

According to an embodiment, there is provided a liquid crystal display apparatus including an optical sheet, an illumination light source, and a liquid crystal display panel.

The optical sheet is constituted of a single translucent resin material layer having a first surface that light enters and a second surface that the light exits. The optical sheet includes a structure surface portion having a geometric configuration on at least one of the first surface and the second surface. The optical sheet is orientationally crystallized in a first in-plane axis direction and a second in-plane axis direction orthogonal to each other. The optical sheet has a linear expansion coefficient of $1.0*10E-5/°$ C. or less in all in-plane directions.

The illumination light source is provided on the first surface side of the optical sheet and irradiates light onto the first surface.

The liquid crystal display panel is provided on the second surface side of the optical sheet.

According to the liquid crystal display apparatus, since a deformation of the optical sheet due to a thermal expansion is suppressed, luminance unevenness accompanying the deformation of the optical sheet is not visually recognized through the liquid crystal display panel. Accordingly, an image quality of a display image can be prevented from deteriorating.

According to the embodiments, a deformation of an optical sheet due to a thermal expansion can be suppressed. As a result, a surface-emitting apparatus and a liquid crystal display apparatus having less luminance unevenness can be provided.

These and other objects, features and advantages will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 7 is a diagram showing an evaluation result of a physical property and characteristics of samples according to examples.

DETAILED DESCRIPTION

Hereinafter, an embodiment will be described with reference to the drawings.

Figure 1:
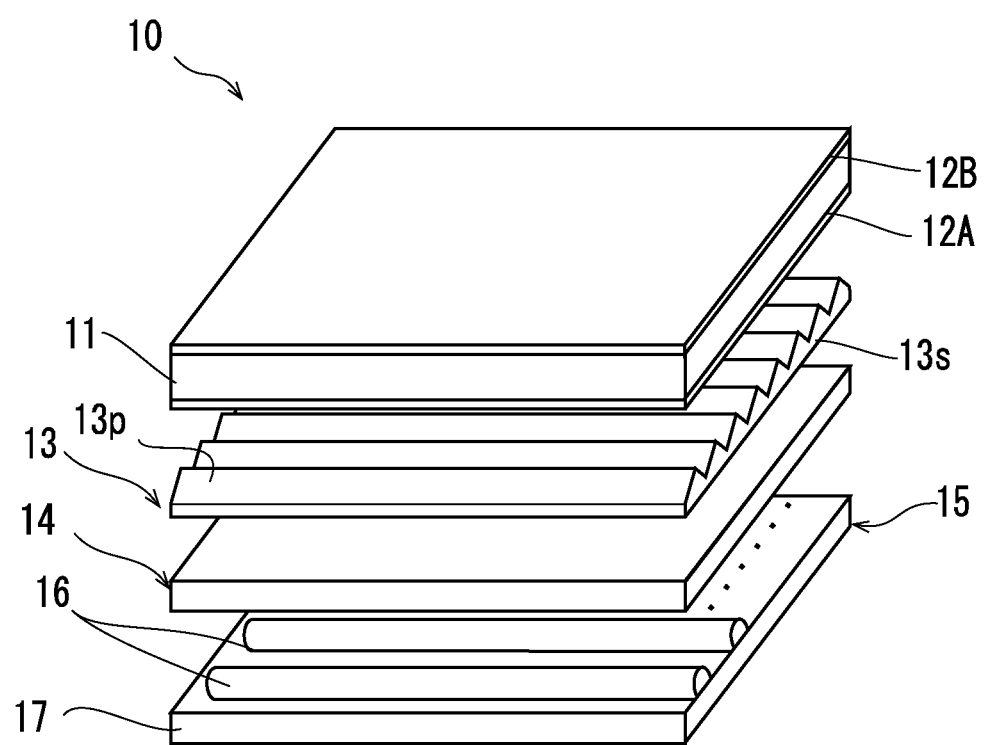
FIG. 1 is an exploded perspective view showing a schematic structure of a liquid crystal display apparatus according to an embodiment.

FIG. 1 is an exploded perspective view showing a schematic structure of a liquid crystal display apparatus according to an embodiment of the present invention. First, an overall structure of a liquid crystal display apparatus 10 will be described.

(Overall Structure of Liquid Crystal Display Apparatus)

The liquid crystal display apparatus 10 of this embodiment includes a liquid crystal display panel 11, a first polarizer 12A, a second polarizer 12B, a prism sheet 13, a diffuser plate 14, and a backlight unit 15.

The liquid crystal display panel 11 has a structure in which a liquid crystal layer is sandwiched by a pair of transparent substrates. A driving method of the liquid crystal layer is not particularly limited, and a VA (Vertical Alignment) method, an IPS (In Plane Switching) method, and a TN (Twisted Nematic) method, for example, are applicable.

The first polarizer 12A is a polarizer arranged on a light-incident side of the liquid crystal display panel 11. The second polarizer 12B is a polarizer arranged on a light-emitting side of the liquid crystal display panel 11. The first polarizer 12A and the second polarizer 12B each include a light transmission axis and a light absorption axis orthogonal to the light transmission axis. In this embodiment, the light transmission axis of the first polarizer 12A and the light transmission axis of the second polarizer 12B are orthogonal to each other.

The prism sheet 13 is used as a luminance improvement film (or sheet) for improving a front luminance of the liquid crystal display apparatus 10. The prism sheet 13 is provided on the light-emitting side of the diffuser plate 14 that diffuses illumination light (backlight light) from the backlight unit 15. The prism sheet 13 has a function of collecting light emitted from the diffuser plate 14 in a front direction to thus improve a front luminance of the liquid crystal display panel 11.

The backlight unit 15 as an illumination light source is structured as a direct backlight that includes a plurality of linear light sources 16 and a reflective plate 17. Alternatively, the backlight unit 15 may be structured as an edge-light-type backlight that uses a light guide plate. Moreover, although a linear light source such as a cold-cathode tube is used as each of the linear light sources 16, a light-emitting diode, an organic electroluminescence device, or the like may be used instead, for example.

By incorporating the prism sheet 13 and the diffuser plate 14 into the backlight unit 15, a surface-emitting apparatus that illuminates the liquid crystal display panel 11 from a back side is structured. The optical sheets to be incorporated into the backlight unit 15 are not limited to the prism sheet 13 and the diffuser plate 14, and a polarization separation sheet that splits illumination light into a P wave and an S wave may also be incorporated into the backlight unit 15, for example. In addition, a plurality of prism sheets 13 and diffuser plates 14 may be used as necessary.

(Structure of Prism Sheet)

Next, the prism sheet 13 will be described in detail.

Figure 2:
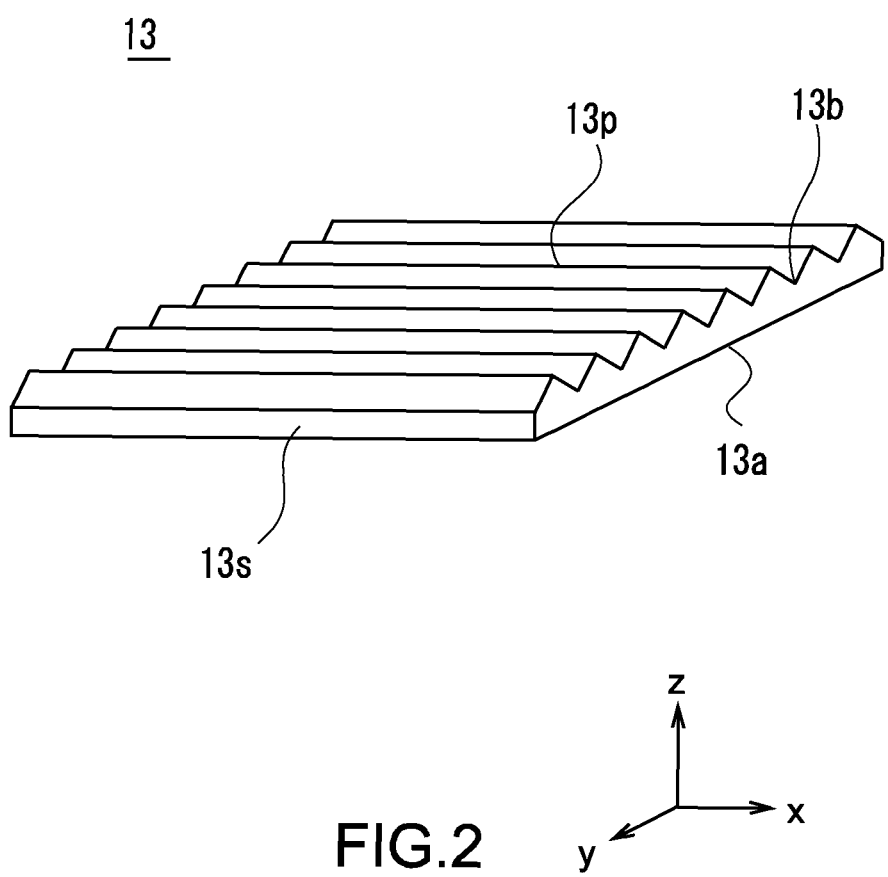
FIG. 2 is a perspective view showing a schematic structure of an optical sheet according to the embodiment.

FIG. 2 schematically shows an overall structure of the prism sheet 13. The prism sheet 13 includes a sheet body 13s constituted of a single translucent resin material layer. The sheet body 13s includes a light-incident surface 13a and a light-emitting surface 13b. The light-incident surface 13a is provided on the backlight side, whereas the light-emitting surface 13b is provided on the liquid crystal display panel 11 side. The light-incident surface 13a and the light-emitting surface 13b each constitute an interface between the prism sheet 13 (sheet body 13s) and an air layer.

A structure surface portion 13p having a geometric configuration is formed on the light-emitting surface 13b. The structure surface portion 13p is formed on the light-emitting surface 13b of the sheet body 13s using a transfer mold on which a structure surface having a corresponding configuration is formed. Therefore, the structure surface portion 13p is also formed of the same material as the sheet body 13s. Although the structure surface portion 13p is formed on an entire surface of the light-emitting surface 13b, the present invention is not limited thereto, and the structure surface portion 13p may be formed partially in an area corresponding to an effective pixel area of the liquid crystal display panel 11, for example.

In this embodiment, a yz cross-sectional shape of the structure surface portion 13p is a triangular prism. In this embodiment, the structure surface portion 13p is formed to have a cross-sectional shape of an isosceles triangle. An apex angle of the prisms is not particularly limited and can be set as appropriate to be, for example, 60 degrees or more and 120 degrees or less based on target luminance characteristics. Particularly in this range, the apex angle can be set to be 85 degrees or more and 95 degrees or less like 90 degrees. An apex of the prism does not need to be sharp and may be curved instead. The structure surface portion 13p is constituted of a plurality of rows of prism surfaces. The prisms each having a ridge line extending in an x direction are arranged in a y direction. An arrangement pitch of the prisms (distance between apexes of two adjacent prisms) is not particularly limited. For example, the arrangement pitch of 50 μm or less can suppress moire.

The structure surface portion 13p is not limited to the prism configuration described above and may be a lenticular lens having a curved yz cross section like a cylindrical lens and a toroidal lens. Even with such a configuration, predetermined light collection characteristics can be obtained. Alternatively, the structure surface portion 13p may be a light collection sheet such as a lens array in which lenses are arranged in the x and y directions at predetermined intervals.

On the other hand, the light-incident surface 13a of the sheet body 13s is formed to be flat. It is also possible to form the light-incident surface 13a as an embossed surface having predetermined surface roughness. Alternatively, a structure surface portion having a geometric configuration may also be formed on the light-incident surface 13a. In this case, a configuration of the structure surface portion of the light-incident surface 13a may either be the same as or different from that of the light-emitting surface 13b.

The sheet body 13s is formed of a crystalline resin material such as PET (polyethylene terephthalate), PEN (polyethylene naphthalate), and a PET-PEN copolymer. The sheet body 13s has an oriented crystallization in mutually-orthogonal in-plane biaxial directions (x and y directions in FIG. 2).

A first object of the oriented crystallization is to reduce a linear expansion coefficient of the sheet body 13s along crystalline orientation directions. In general, the linear expansion coefficient is a fixed value that is determined based on a resin property. However, the crystalline resin has characteristics that, along with a progress of the oriented crystallization, the linear expansion coefficient also changes in the orientation directions. Specifically, the crystalline resin has characteristics that a Young's modulus increases in the crystalline orientation directions, and the linear expansion coefficient decreases linearly accompanying the increase in the Young's modulus. Due to a reduction in the linear expansion coefficient of the sheet body 13s (or increase in Young's modulus), a deformation of the sheet body 13s due to a thermal expansion can be suppressed.

Further, since the sheet body 13s has an oriented crystallization in the in-plane biaxial directions, the linear expansion coefficient is reduced in the in-plane biaxial directions. For example, in an oriented crystallization based on a uniaxial stretch, the linear expansion coefficients largely differ between a stretching direction and a direction orthogonal to the stretching direction. As a result, due to unevenness of a deformation amount within the plane caused by the thermal expansion, a swell of the sheet occurs more easily. To avoid this problem, in this embodiment, a swell of the sheet body 13s that is caused under a high-temperature environment is suppressed by stretching the crystalline resin sheet in the in-plane biaxial directions to thus reduce a difference in the linear expansion coefficients between the biaxial directions. Particularly by equalizing stretching ratios of the sheet in the biaxial directions in the biaxial stretch, linear expansion coefficients can be uniformized between the axes, with the result that a swell of the sheet due to a difference in the thermal expansion amounts can be suppressed.

In this embodiment, the sheet body 13s is orientationally crystallized so that the linear expansion coefficient becomes $1.0*10E-5/°C.$ or less in all the in-plane directions parallel to an xy plane (hereinafter, referred to as xy plane direction). In this case, the Young's modulus of the sheet body 13s in the xy plane direction is 3.0 GPa or more. A linear expansion coefficient of an amorphous resin such as polycarbonate (PC) and polystyrene (PS) that is widely used as a constituent material of an optical sheet is on the $1.0*10E-5$ ($1.0*10^{-5}$)'s, which is relatively large. When using this type of an amorphous resin sheet, it is possible to increase a sheet thickness to secure a rigidity for solving the problem on a swell. With this method, however, the sheet thickness cannot be reduced and material costs are increased due to an increase in the thickness, which is unfavorable.

A second object of the oriented crystallization is to secure a transparency of the crystalline resin layer. When crystallized randomly, the crystalline resin is whitened, and a transmittance decreases prominently. Such a resin sheet does not have enough durability as an optical sheet. In this embodiment, by orientationally crystallizing the sheet body 13s in the biaxial directions, regularity is imparted to the orientation characteristics and a decrease in the transmittance due to whitening is suppressed. The sheet body 13s has a total light transmittance of, for example, 80% or more.

A third object of the oriented crystallization is to increase a refractive index of the sheet body 13s. Along with a progress of the crystallization, a refractive index of the crystalline resin increases in the crystalline orientation directions. For example, in a sheet in which a prism surface is formed on a light-emitting surface, as a refractive index of the sheet increases, a difference in the refractive indices between the sheet and an air layer increases, and a refraction angle on the light-emitting surface increases. Accordingly, light that is obliquely transmitted through an inner sheet portion is deflected more easily in a front direction in the light-emitting surface, and a front luminance is thus improved. In this embodiment, because a crystalline resin such as PET, PEN, and a PET-PEN copolymer is used, the sheet body 13s has a refractive index of 1.59 or more.

The thickness of the sheet body 13s corresponds to the thickness of the prism sheet 13. Therefore, thinning of the sheet body 13s is essential for realizing thinning of a liquid crystal display apparatus and a surface-emitting apparatus. For example, the thickness of the prism sheet 13 is set to be 10 μm or more and 300 μm or less. With a thickness smaller than 10 μm, there is a fear that a handling ability is lowered. On the other hand, a thickness exceeding 300 μm lowers a contribution ratio of the sheet to thinning A dimension of the sheet body 13s in the thickness direction is reduced in the biaxial stretch. Therefore, depending on the stretching ratio of the sheet body 13s, the thickness of the sheet body 13s can also be controlled.

(Operation of Prism Sheet)

By incorporating the prism sheet 13 structured as described above and the diffuser plate 14 into the backlight unit 15, a surface-emitting apparatus that illuminates the liquid crystal display panel 11 is structured. The prism sheet 13 functions to improve the luminance by collecting illumination light emitted from the backlight unit 15 on the liquid crystal display panel 11 while the liquid crystal display apparatus 10 is operating.

On the other hand, the prism sheet 13 receives a thermal load due to heat radiated from the backlight unit 15 and the liquid crystal display panel 11. At this time, if a deformation including a warpage and a swell due to a thermal expansion is caused in the prism sheet 13, the in-plane luminance uniformity may be lowered, and luminance unevenness may be caused in a display image displayed on the liquid crystal display panel 11. In this regard, since the prism sheet 13 of this embodiment has the structure described above, a deformation due to a thermal expansion is suppressed, and luminance unevenness is prevented from occurring.

Specifically, the prism sheet 13 of this embodiment is constituted of a single resin material layer. Therefore, a sheet warpage that is caused due to a difference in the thermal expansion coefficients among layers in a case where the prism sheet 13 is constituted of a multilayer structure formed of different types of materials can be prevented from occurring.

Moreover, since the prism sheet 13 is orientationally crystallized in the in-plane biaxial directions, a rigidity is enhanced in the orientation directions. Accordingly, a linear expansion coefficient can be reduced, and a deformation amount of the optical sheet due to a thermal expansion can be suppressed to be small.

Furthermore, since the thermal expansion of the prism sheet 13 can be suppressed in all the in-plane directions, a swell of the sheet that is due to a difference in the thermal expansion amounts between the in-plane biaxial directions can be suppressed.

Unlike the random crystallization, the oriented crystallization can prevent the sheet from whitening. Accordingly, because a transparency of the sheet body is maintained, an effect of the optical sheet is not lost.

There is also an advantage that, by using a crystalline material such as PET, PEN, and a PET-PEN copolymer, the prism sheet can be produced at a relatively low cost.

Moreover, by using the prism sheet 13 having the characteristics as described above, a surface-emitting apparatus and a liquid crystal display apparatus having suppressed luminance unevenness and excellent luminance uniformity can be structured.

(Prism Sheet Production Method)

Next, a method of producing the prism sheet 13 structured as described above will be described.

The method of producing the prism sheet 13 of this embodiment includes a sheet production step, a sheet orientational-crystallization step, and a structure surface portion forming step.

A crystalline resin in an amorphous state is used in producing a sheet. As the crystalline resin, PET, PEN, or a PET-PEN copolymer is used. Here, the amorphous state only needs to be a state where a crystallinity is, for example, 15% or less and crystallization in a desired direction can be easily obtained in the orientational-crystallization step after that. This is because, if the crystallinity exceeds 15%, a decrease of a transmittance due to whitening becomes prominent, and the sheet becomes unsuitable for use as an optical sheet. Moreover, if the crystallinity exceeds 15%, a Young's modulus of the material generally becomes high. Therefore, when the sheet is subjected to stretching processing after that, a load required for the stretch becomes large, with the result that it becomes necessary to set a heating temperature at a time of the stretch to a higher temperature.

Examples of such a sheet production method include a melt extrusion molding method and a cast method. The produced sheet may be a sheet cut in a predetermined size or a long strip-shaped sheet. It should be noted that a commercially-available sheet may also be used as the sheet.

The produced sheet is stretched in the biaxial directions in the sheet orientational-crystallization step so that the sheet is orientionally crystallized in the in-plane biaxial directions. In the stretching step, a uniaxial stretching machine that stretches a sheet in a feeding direction (MD (Machine Direction) direction) (roll stretching machine or zone uniaxial stretching machine) and a uniaxial stretching machine that stretches a sheet in a direction orthogonal to the feeding direction (TD (Transverse Direction) direction) (tenter) can be used together. Alternatively, biaxial stretches in the TD direction and the MD direction can be carried out at the same time using the tenter.

Figure 3:
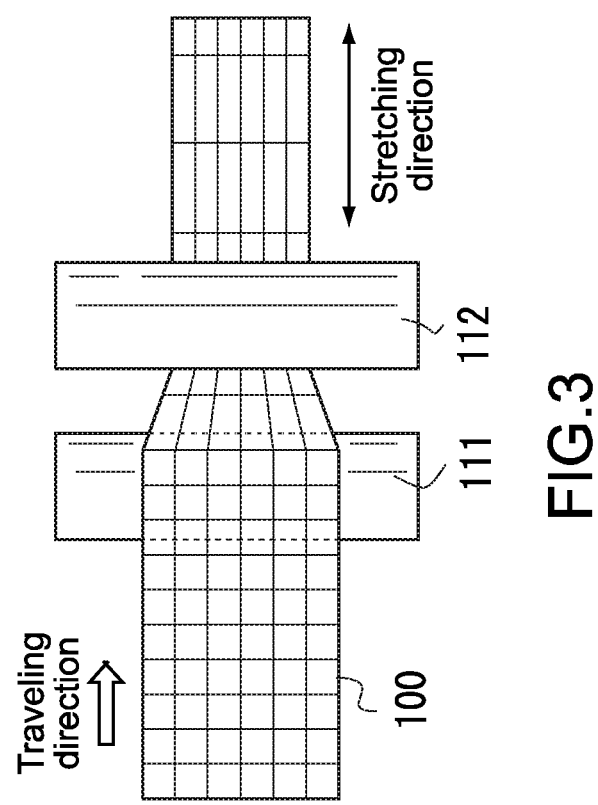
FIG. 3 is a plan view showing an example of a stretching machine used in an optical sheet production method according to the embodiment.

FIG. 3 is a schematic plan view showing a typical roll stretching machine. The roll stretching machine includes a plurality of stretching rolls 111 and 112 that stretch a strip-shaped sheet 100 heated to a certain temperature in a traveling direction. The stretching roll 112 is rotated at a higher rotating velocity than the stretching roll 111 and stretches the strip-shaped sheet 100 between those rolls along the traveling direction. Although the sheet 100 is freely contracted in a width direction at the time of the stretch in the example shown in the figure, the sheet width may be fixed so that the free contraction in that direction is restricted.

A stretching ratio is controlled by a rotating velocity difference between the stretching rolls 111 and 112. In this embodiment, the stretching ratio is set such that a linear expansion coefficient of $1.0*10E-5/°C$. or less (Young's modulus of 3.0 GPa or more) is exerted in the MD direction (e.g., y direction in FIG. 2).

Figure 4:
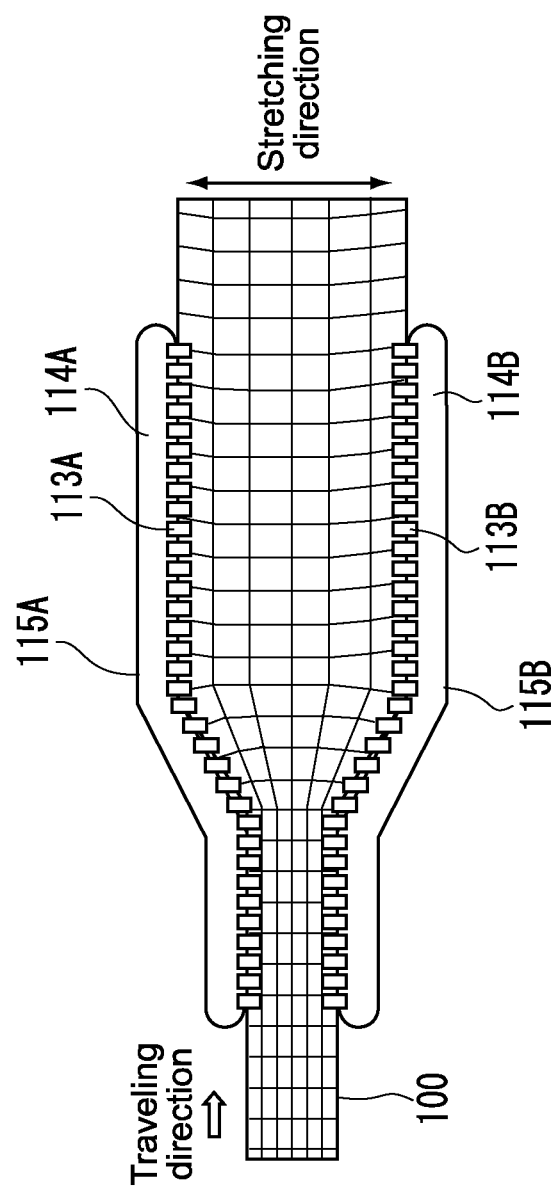
FIG. 4 is a plan view showing another example of the stretching machine used in the optical sheet production method according to the embodiment.

FIG. 4 is a schematic plan view showing a typical tenter. This stretching machine includes a plurality of sets of clip pairs that clamp both ends of the traveling strip-shaped sheet 100 in the width direction. Each of the clip pairs face each other in the width direction of the sheet 100, and clips 113A, 113B, 114A, and 114B move along guide rails 115A and 115B. The guide rails 115A and 115B are provided symmetrically so as to move the sets of clips away from each other in the width direction of the sheet 100 in sync with a feeding velocity of the sheet 100. Accordingly, the sheet 100 is stretched in the direction orthogonal to the traveling direction.

The stretching ratio is controlled by a sum of movement amounts of the sets of clips in the sheet width direction. In this embodiment, the stretching ratio is set such that a linear expansion coefficient of $1.0*10E-5/°C$. or less (Young's modulus of 3.0 GPa or more) is exerted in the TD direction (e.g., x direction in FIG. 2).

It should be noted that by changing a movement velocity of the clips in the sheet traveling direction by a predetermined change rate in sync with the movement in the sheet width direction, the sheet 100 can be stretched in both the TD direction and the MD direction.

Figure 5:
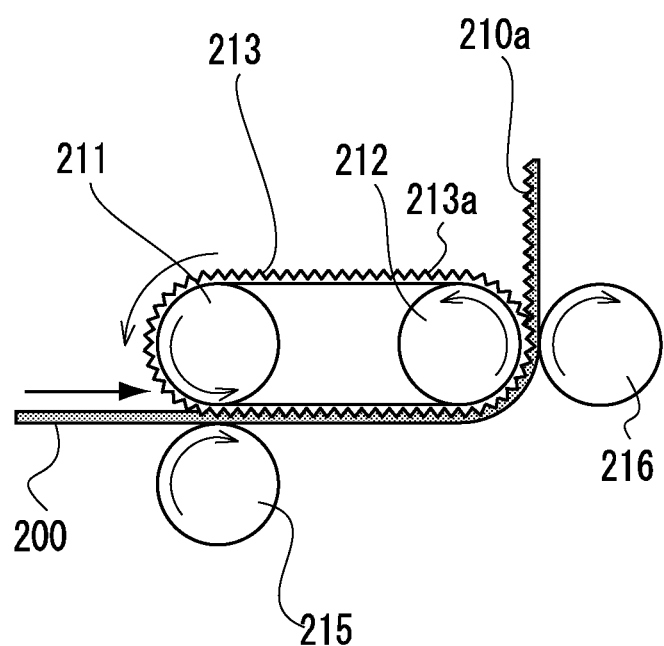
FIG. 5 is a side view showing an example of a transfer apparatus used in the optical sheet production method according to the embodiment.

A transfer mold including a structure surface having a geometric configuration can be used in the structure surface portion forming step. The structure surface portion is formed by transferring the transfer mold onto at least one of the surfaces of the produced strip-shaped sheet. In the structure surface portion forming step, a transfer apparatus including an endless belt, a heat press apparatus, and the like can be used, for example. FIG. 5 shows a schematic structure of the transfer apparatus including an endless belt.

The transfer apparatus shown in FIG. 5 includes a heating roll 211 and a cooling roll 212 provided with a predetermined interval therebetween, and an endless belt 213 is wound around those rolls 211 and 212. On an outer circumferential surface of the endless belt 213, embosses (structure surface) 213a having a configuration corresponding to a configuration of a structure surface portion formed on a surface of a strip-shaped sheet 200 are formed. In this embodiment, the structure surface is formed to have a prism configuration. A ridge line direction of each prism extends in the width direction (TD direction) of the endless belt 213. The transfer apparatus includes nip rolls 215 and 216 that are opposed to the heating roll 211 and the cooling roll 212, respectively, with predetermined gaps therebetween.

The strip-shaped sheet 200 is supplied between the heating roll 211 and the nip roll 215, and the structure surface 213a of the endless belt 213 is transferred onto the sheet surface. By heating the sheet 200 to a temperature equal to or higher than a glass transition temperature (Tg) by the heating roll 211, a structure surface portion having a configuration corresponding to the configuration of the embosses 213a is formed on the sheet surface. A surface temperature of the heating roll 211 is set to be equal to or higher than Tg.

After the configuration of the embosses 213a is transferred thereon, the sheet 200 is integrally conveyed with the endless belt 213 to be supplied between the cooling roll 212 and the nip roll 216. Then, the sheet 200 is (rapidly) cooled to a predetermined temperature by the cooling roll 212. A surface temperature of the cooling roll 212 is set to be lower than Tg of the sheet 200 (e.g., 30° C.). The sheet 200 having a structure surface portion 210a formed on the surface is produced as described above.

Figure 6:
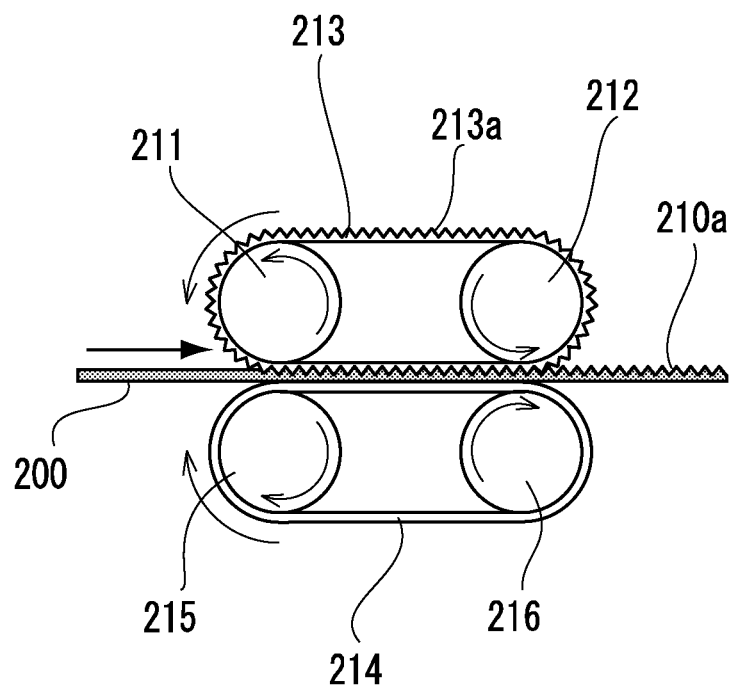
FIG. 6 is a side view showing a modified example of the structure of the transfer apparatus shown in FIG. 5.

FIG. 6 shows a modified example of the structure of the transfer apparatus shown in FIG. 5. The transfer apparatus shown in FIG. 6 includes a first endless belt 213 wound around the heating roll 211 and the cooling roll 212 and a second endless belt 214 wound around the nip rolls 215 and 216. On an outer circumferential surface of the first endless belt 213, embosses for forming the structure surface portion 210a on one surface of the sheet 200 are formed. An outer circumferential surface of the second endless belt 214 is formed as a flat surface in the example shown in the figure.

In the transfer apparatus having the above structure, the sheet 200 is conveyed while being nipped by the two endless belts 213 and 214 along a conveying path from the heating roll 211 to the cooling roll 212. Accordingly, the sheet 200 can be conveyed stably, and a conveying velocity can be increased. Further, by forming predetermined embosses on the outer circumferential surface of the second endless belt 214, a structure surface portion having a predetermined geometric configuration can also be formed on a back surface of the sheet 200.

The order of performing the orientational-crystallization (stretching) step and the structure surface transfer step in the production of the prism sheet 13 is not particularly limited. The prism sheet 13 of this embodiment is produced by cutting the sheet produced through those steps in a predetermined size.

For example, the structure surface portion can be formed on the surface of the produced sheet after the sheet is stretched in the biaxial directions. Since the sheet is physically deformed in the stretching step, the configuration of the structure surface portion is apt to change before and after the stretching step. Therefore, regarding an optical sheet in which the structure surface portion is required to have a high shape accuracy, a method of transferring a configuration of the structure surface portion onto a stretched sheet is advantageous.

On the other hand, it is possible to use a physical change of the sheet before and after the stretch to adjust a final configuration of the structure surface portion. In this case, the stretching step only needs to be carried out after the structure surface portion forming step.

Moreover, as described above, since the stretching step can be carried out independently in the MD direction and the TD direction, the structure surface portion forming step can be inserted between the stretching step in the MD direction and the stretching step in the TD direction.

For example, when producing the prism sheet 13 shown in FIG. 2, the stretching step in the y direction (MD direction) (first stretching step), the prism surface (structure surface portion 13p) forming step, and the stretching step in the x direction (TD direction) (second stretching step) can be carried out in the stated order. Accordingly, since the final stretching step is carried out along the ridge line direction of the prisms (x direction), changes of arrangement pitches and configurations of the prisms can be suppressed. It should be noted that it is also possible to set the stretching direction of the second step to be the y direction in a case where the arrangement pitches and configurations are adjusted in the final stretching step, for example.

The prism sheet 13 is produced as described above. According to this embodiment, a prism sheet 13 having a small linear expansion coefficient in the in-plane directions can be produced. Moreover, since the linear expansion coefficient can be controlled by the stretching ratio of the sheet, desired heat characteristics can be imparted with ease. In addition, desired optical characteristics including a transmittance and a refractive index can be obtained at the same time by the processing described above.

Furthermore, by equalizing the stretching ratios of the sheet in the biaxial directions in the biaxial stretch, the linear expansion coefficients can be uniformized between the axes, and a swell of the sheet due to a difference in the thermal expansion amounts can be suppressed.

EXAMPLES

Examples will be described below.

Under the following conditions, a plurality of prism sheets having different structures were produced, and the prism sheets were each incorporated as the prism sheet 13 of the liquid crystal display apparatus 10 shown in FIG. 1. After two hours since the light-up of the backlight, states of swells of the prism sheets were visually evaluated from the front of the panel 11.

The swells were evaluated based on visually-recognized luminance unevenness of the panel. Evaluation results were categorized into the following three stages.
"○": No swell visually recognized
"Δ": Swell visually recognized in part
"x": Swell visually recognized in whole
Production conditions of the prism sheets are as follows.

Example 1

An amorphous PET plain sheet (refractive index of 1.57, isotropic) having a thickness of 500 μm was stretched by a 2.0-fold stretching ratio in both the MD direction and the TD direction by a biaxial stretching machine. Next, a matrix (transfer mold) having a prism configuration in which a base angle is 45 degrees and a pitch is 50 μm was pressurized at a temperature equal to or larger than Tg to thus shape the stretched sheet, and the sheet was cooled to a temperature equal to or smaller than Tg after that and peeled off from the matrix.

It was confirmed that the prism sheet produced as described above had a desired configuration while maintaining its transparency.

Example 2

An amorphous PET plain sheet (refractive index of 1.57, isotropic) having a thickness of 250 μm was stretched uniaxially by a uniaxial stretching machine in a state where a sheet width is fixed. A stretching ratio was 1.5 fold. Next, a matrix (transfer mold) having a prism configuration in which a base angle is 45 degrees and a pitch is 50 μm was pressurized at a temperature equal to or larger than Tg to thus shape the stretched sheet, and the sheet was cooled to a temperature equal to or smaller than Tg after that and peeled off from the matrix. At this time, the prism configuration was transferred such that a ridge line direction of the prisms became orthogonal to the orientation direction (stretching direction). Subsequently, the sheet was stretched by a 1.5-fold stretching ratio in the ridge line direction of the prisms (direction orthogonal to first stretching direction) by the uniaxial stretching machine. At this time, an end portion of the sheet on a front side of the feeding direction can be freely contracted.

It was confirmed that the prism sheet produced as described above had a desired configuration while maintaining its transparency. It was also confirmed that the obtained prism configuration had a base angle of 45 degrees and a pitch of 40.8 μm.

Example 3

An amorphous PEN plain sheet (refractive index of 1.64, isotropic) having a thickness of 500 μm was stretched by a 2.0-fold stretching ratio in both the MD direction and the TD direction by a biaxial stretching machine. Next, a matrix (transfer mold) having a prism configuration in which a base angle is 45 degrees and a pitch is 50 μm was pressurized at a temperature equal to or larger than Tg to thus shape the stretched sheet, and the sheet was cooled to a temperature equal to or smaller than Tg after that and peeled off from the matrix.

It was confirmed that the prism sheet produced as described above had a desired configuration while maintaining its transparency.

Example 4

An amorphous PET-PEN copolymer (PET/PEN: 90/10) plain sheet (refractive index of 1.64, isotropic) having a thickness of 500 μm was stretched by a 2.0-fold stretching ratio in both the MD direction and the TD direction by a biaxial stretching machine. Next, a matrix (transfer mold) having a prism configuration in which a base angle is 45 degrees and a pitch is 50 μm was pressurized at a temperature equal to or larger than Tg to thus shape the stretched sheet, and the sheet was cooled to a temperature equal to or smaller than Tg after that and peeled off from the matrix.

It was confirmed that the prism sheet produced as described above had a desired configuration while maintaining its transparency.

Comparative Example 1

A PC (polycarbonate) plain sheet (refractive index of 1.59, isotropic) having a thickness of 125 μm was prepared. Next, a matrix (transfer mold) having a prism configuration in which a base angle is 45 degrees and a pitch is 50 μm was pressurized at a temperature equal to or larger than Tg to thus shape the sheet, and the sheet was cooled to a temperature equal to or smaller than Tg after that and peeled off from the matrix.

It was confirmed that the prism sheet produced as described above had a desired configuration while maintaining its transparency.

Comparative Example 2

A prism configuration in which a base angle is 45 degrees and a pitch is 50 μm was transferred onto one surface of a biaxially-stretched PET (refractive index of 1.68, isotropic) having a thickness of 100 μm using an ultraviolet curable acrylic resin.

It was confirmed that the prism sheet produced as described above had a desired configuration while maintaining its transparency.

Comparative Example 3

An amorphous PET plain sheet (refractive index of 1.57, isotropic) having a thickness of 250 μm was prepared. Next, a matrix (transfer mold) having a prism configuration in which a base angle is 45 degrees and a pitch is 50 μm was pressurized at a temperature equal to or larger than Tg to thus shape the sheet, and the sheet was cooled to a temperature equal to or smaller than Tg after that and peeled off from the matrix.

It was confirmed that the prism sheet produced as described above had a desired configuration while maintaining its transparency.

Comparative Example 4

An amorphous PET plain sheet (refractive index of 1.57, isotropic) having a thickness of 250 μm was prepared. Next, a matrix (transfer mold) having a prism configuration in which a base angle is 45 degrees and a pitch is 50 μm was pressurized at a temperature equal to or larger than Tg to thus shape the sheet, and the sheet was cooled to a temperature equal to or smaller than Tg after that and peeled off from the matrix. At this time, a time period required for cooling the sheet to a temperature equal to or smaller than Tg since transferring the configuration was set to be twice as large as that of Comparative Example 3.

It was confirmed that the prism sheet produced as described above had a desired configuration although slightly whitened due to the fact that the time period required for cooling the sheet since transferring the configuration was twice as large as that of Comparative Example 3.

Comparative Example 5

An amorphous PET plain sheet (refractive index of 1.57, isotropic) having a thickness of 250 μm was prepared. Next, a matrix (transfer mold) having a prism configuration in which a base angle is 45 degrees and a pitch is 50 μm was pressurized at a temperature equal to or larger than Tg to thus shape the sheet, and the sheet was cooled to a temperature equal to or smaller than Tg after that and peeled off from the matrix. At this time, a time period required for cooling the sheet to a temperature equal to or smaller than Tg since transferring the configuration was set to be three times as large as that of Comparative Example 3.

It was confirmed that the prism sheet produced as described above had a desired configuration although whitened due to the fact that the time period required for cooling the sheet since transferring the configuration was three times as large as that of Comparative Example 3.

Comparative Example 6

An amorphous PET plain sheet (refractive index of 1.57, isotropic) having a thickness of 500 μm was prepared. Next, a matrix (transfer mold) having a prism configuration in which a base angle is 45 degrees and a pitch is 50 μm was pressurized at a temperature equal to or larger than Tg to thus shape the sheet, and the sheet was cooled to a temperature equal to or smaller than Tg after that and peeled off from the matrix. Subsequently, the sheet was stretched by a 4-fold stretching ratio in the ridge line direction of the prisms by a uniaxial stretching machine. At this time, an end portion of the sheet on a front side of the feeding direction can be freely contracted.

It was confirmed that the prism sheet produced as described above had a desired configuration while maintaining its transparency. It was also confirmed that the obtained prism configuration had a base angle of 45 degrees and a pitch of 25 μm.

Evaluation results of the produced prism sheets on the thickness, the linear expansion coefficient and Young's modulus in the MD and TD directions, a total light transmittance, and a swell are shown in FIG. 7.

As shown in FIG. 7, even under a high-temperature environment of the backlight unit, a swell was not recognized in the prism sheets according to Examples 1 to 4 in which the linear expansion coefficients are 1.0*10E−5/° C. or less (Young's modulus of 3 GPa or more) in all the in-plane directions. On the other hand, a swell was recognized in the prism sheets according to Comparative Examples 1 to 4 and 6 in which the linear expansion coefficients exceed the above range in all the in-plane directions.

Since the linear expansion coefficient is within the above range in Comparative Example 5, a swell was not recognized.

However, due to a low total light transmittance, the prism sheet did not have optical characteristics suitable as an optical sheet.

However, the embodiment is also applicable to an optical sheet that has a structure surface portion having a geometric configuration on its surface, such as a diffusion sheet and a lens sheet.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical light collecting sheet comprising:
   a sheet body including a single translucent resin material layer having a first surface that light enters and a second surface that the light exits, the sheet body being orientationally crystallized in a first in-plane axis direction and a second in-plane axis direction orthogonal to each other and having a linear expansion coefficient of $1.0*10E-5/°$ C. or less in all in-plane directions; and
   a structure surface portion that has a geometric configuration and is formed on at least one of the first surface and the second surface,
   wherein the structure surface portion is formed on the second surface, and
   wherein the geometric configuration includes a prism configuration having a triangular cross section, the prism configuration having a ridge line in the first in-plane axis direction.

2. The optical sheet according to claim 1,
   wherein the sheet body is formed of a crystalline resin stretched in the first in-plane axis direction and the second in-plane axis direction.

3. The optical sheet according to claim 2,
   wherein the crystalline resin is any of PET (polyethylene terephthalate), PEN (polyethylene naphthalate), and a PET-PEN copolymer.

4. The optical sheet according to claim 1,
   wherein the sheet body has a Young's modulus of 3.0 GPa or more in all the in-plane directions.

5. The optical sheet according to claim 1,
   wherein the sheet body has a total light transmittance of 80% or more.

6. The optical sheet according to claim 1,
   wherein a thickness of the sheet body including the structure surface portion is 10 μm or more and 300 μm or less.

7. The optical sheet according to claim 1,
   wherein a refractive index in the first in-plane axis direction and the second in-plane axis direction is 1.59 or more.

8. A surface-emitting apparatus comprising:
   an optical sheet including a single translucent resin material layer having a first surface that light enters and a second surface that the light exits and includes a structure surface portion having a geometric configuration on at least one of the first surface and the second surface, the optical sheet being orientationally crystallized in a first in-plane axis direction and a second in-plane axis direction orthogonal to each other and having a linear expansion coefficient of $1.0*10E-5/°$ C. or less in all in-plane directions; and
   an illumination light source that is provided on the first surface side of the optical sheet and irradiates light onto the first surface,
   wherein the structure surface portion is formed on the second surface, and
   wherein the geometric configuration includes a prism configuration having a triangular cross section, the prism configuration having a ridge line in the first in-plane axis direction.

9. A liquid crystal display apparatus comprising:
   an optical sheet including a single translucent resin material layer having a first surface that light enters and a second surface that the light exits and includes a structure surface portion having a geometric configuration on at least one of the first surface and the second surface, the optical sheet being orientationally crystallized in a first in-plane axis direction and a second in-plane axis direction orthogonal to each other and having a linear expansion coefficient of $1.0*10E-5/°$ C. or less in all in-plane directions;
   an illumination light source that is provided on the first surface side of the optical sheet and irradiates light onto the first surface; and
   a liquid crystal display panel provided on the second surface side of the optical sheet,
   wherein the structure surface portion is formed on the second surface, and
   wherein the geometric configuration includes a prism configuration having a triangular cross section, the prism configuration having a ridge line in the first in-plane axis direction.

10. An optical sheet comprising:
    a sheet body including a single translucent resin material layer having a first surface that light enters and a second surface that the light exits, the sheet body being orientationally crystallized in a first in-plane axis direction and a second in-plane axis direction orthogonal to each other and having a Young's modulus of 3.0 GPa or more in all in-plane directions; and
    a structure surface portion that has a geometric configuration and is formed on at least one of the first surface and the second surface,
    wherein the structure surface portion is formed on the second surface, and
    wherein the geometric configuration includes a prism configuration having a triangular cross section, the prism configuration having a ridge line in the first in-plane axis direction.

11. A surface-emitting apparatus comprising:
    an optical sheet including a single translucent resin material layer having a first surface that light enters and a second surface that the light exits and includes a structure surface portion having a geometric configuration on at least one of the first surface and the second surface, the optical sheet being orientationally crystallized in a first in-plane axis direction and a second in-plane axis direction orthogonal to each other and having a Young's modulus of 3.0 GPa or more in all in-plane directions; and
    an illumination light source that is provided on the first surface side of the optical sheet and irradiates light onto the first surface,
    wherein the structure surface portion is formed on the second surface, and wherein the geometric configuration includes a prism configuration having a triangular cross section, the prism configuration having a ridge line in the first in-plane axis direction.

12. A liquid crystal display apparatus comprising:
an optical sheet including a single translucent resin material layer having a first surface that light enters and a second surface that the light exits and includes a structure surface portion having a geometric configuration on at least one of the first surface and the second surface, the optical sheet being orientationally crystallized in a first in-plane axis direction and a second in-plane axis direction orthogonal to each other and having a Young's modulus of 3.0 GPa or more in all in-plane directions;
an illumination light source that is provided on the first surface side of the optical sheet and irradiates light onto the first surface; and
a liquid crystal display panel provided on the second surface side of the optical sheet,
wherein the structure surface portion is formed on the second surface, and
wherein the geometric configuration includes a prism configuration having a triangular cross section, the prism configuration having a ridge line in the first in-plane axis direction.

* * * * *